United States Patent [19]
Haythornthwaite

[11] Patent Number: 5,647,982
[45] Date of Patent: Jul. 15, 1997

[54] VACUUM FILTER ELEMENT

[76] Inventor: James (Jimmy) Haythornthwaite, 155 Fairhaven Box 763, Hudson, PQ, Canada, J0P 1H0

[21] Appl. No.: 438,272

[22] Filed: May 10, 1995

[51] Int. Cl.$^6$ ..................................... B01D 29/05
[52] U.S. Cl. ..................... 210/346; 210/486; 210/487
[58] Field of Search ............................ 210/232, 346, 210/486, 487

[56] References Cited

U.S. PATENT DOCUMENTS

| | | |
|---|---|---|
| 1,459,913 | 6/1923 | Johnson . |
| 2,205,758 | 6/1940 | Clark . |
| 2,426,618 | 9/1947 | Klein ........................... 210/346 |
| 2,722,315 | 11/1955 | Hapman . |
| 3,202,284 | 8/1965 | Wade ........................... 210/346 |
| 3,216,576 | 11/1965 | Roos . |
| 3,261,474 | 7/1966 | Parker et al. . |
| 3,283,906 | 11/1966 | Crane et al. . |
| 3,302,796 | 2/1967 | Downey . |
| 3,331,512 | 7/1967 | Vore . |
| 3,358,843 | 12/1967 | Bourdale . |
| 3,361,262 | 1/1968 | Orr et al. . |
| 3,473,668 | 10/1969 | Bunyard et al. . |
| 3,606,735 | 9/1971 | Baigas . |
| 3,647,071 | 3/1972 | Lamort ........................... 210/487 |
| 3,948,779 | 4/1976 | Jackson . |
| 4,199,456 | 4/1980 | Cheesman . |
| 4,655,920 | 4/1987 | Ragnegard ........................... 210/487 |
| 4,708,797 | 11/1987 | Baur et al. . |
| 4,721,566 | 1/1988 | Chamberlain et al. . |
| 4,968,423 | 11/1990 | McKale et al. ........................... 210/346 |
| 5,057,217 | 10/1991 | Lutz et al. ........................... 210/346 |
| 5,227,065 | 7/1993 | Strid ........................... 210/346 |

*Primary Examiner*—W. L. Walker
*Attorney, Agent, or Firm*—Oliff & Berridge

[57] ABSTRACT

A filter element for use in a rotating vacuum filter assembly is provided. It has frame having an inner end, an outer end and intermediate sides which define the perimeter of opposed substantially parallel filter regions and a central filter chamber, wherein the inner end is adapted for mounting the frame to a hollow central hub and wherein the inner end defines a central passage which cooperates with a corresponding passage in the hub for communication between the filter chamber and the interior of the hub. It uses a pleated insert mounted within the frame substantially parallel to the filter regions to bisect the filter chamber and define a series of alternating opposed V-shaped channels extending from the inner end to the outer end, each of which communicate with the central passage, wherein both sets of ridges of the pleated insert lie substantially coplanar with the corresponding filter regions so that when a filter media is stretched across the filter regions the media will rest upon the ridges and thereby define with the pleated insert a series of V-shaped flow chambers. When a vacuum source is applied at the interior of the hub, liquid is urged to pass through the filter media into the flow chambers and to the hub without the filter media collapsing against the V channel surfaces of the pleated insert. The filter element is useful for removing suspended particles from a liquid carrier.

1 Claim, 2 Drawing Sheets

5,647,982

VACUUM FILTER ELEMENT

FIELD OF THE INVENTION

This invention relates to vacuum filters used to remove suspended particles from a liquid carrier. This invention is particularly concerned with the design of individual filter elements for use in such filter assemblies.

BACKGROUND OF THE INVENTION

In the pulp and paper industry it common to use rotating vacuum filter assemblies, arranged in series of axially spaced disks, to dewater and/or thicken pulp stock chests, to recover fibre and to clarify white water for re-use in applications such as shower water for filters. The general operation and configuration of vacuum filters are further described in U.S. Pat. No. 3,331,512 which issued Jun. 18, 1967 (VORE) and in U.S. Pat. No. 3,283,906 which issued Nov. 8, 1966 (CRANE).

A filter element, as used herein, refers to one of a series of wedge-shaped filtering units that are mounted to and extend radially from a hollow central hub to form a coaxial circular disk-like filter assembly. The number of filter elements that make up each circular filter assembly typically vary between eight and twenty. The central hub rotates about an axis positioned so that the filter assembly is partially submerged in a slurry bath.

Each filter element comprises two oppositely facing filter surfaces covered by a suitable filter media such as polyester or stainless steel mesh. The filter media rests upon the outermost parts of the filter element's filter surface which is typically a plate material which has been perforated or punched to permit passage of the filtrate, as illustrated at 114 in FIG. 4 of CRANE. Each filter element defines one or more central chambers. These chambers communicate, through the necked end of the filter element, with the hollow core of the central hub.

As the filter elements rotate through the lower portion of their circular path they are submersed into a slurry of pulp fibres suspended in liquid. A vacuum source, connected to the hollow central hub, is used to urge liquid to pass through the filter media, into the central chambers of the filter element and then into the central hub. The outer surface of the filter media retains the pulp fibre resulting in the formation of a fibre mat on each of the opposed filter surfaces.

Immediately upon emergence of the filter element from the slurry bath the vacuum source is interrupted. The fibre mat is further dewatered by residual vacuum until the filter element reaches a point in its circular path where a knock-off liquid shower or where scrapers are used to detach the fibre mat from the filter media.

The mat peels off and falls under its own weight into chutes placed adjacent to the surface of the filter assembly. Fixed or oscillating showers are then used to clean any remaining fibre off the filter element prior to its re-submersion in the liquid-fibre bath, to start the cycle over again.

Filter elements are typically removably mounted to the central hub to provide for regular maintenance and replacement. Their design and dimensions vary with each manufacturer of vacuum filter equipment. The replacement cost of each filter element, their efficiency of operation, their ease of manufacture and replacement, their weight and their durability are important factors to operators as they impact operating costs and equipment down-time. The efficiency of a filter element ultimately depends on the filter surface area that is operable at any one time. Weight reductions in the filter element reduce operating power consumption and ease task of filter element replacement.

Conventional vacuum disk filters suffer from inefficiencies caused by obstructed filter surface areas. This may be due to either the structure of the filter-media-supporting perforated plate itself, or due to the tendency of fibre to build-up between the filter media and this underlying plate. Fibre build-up causes a reduction in the operable filter area and creates localized pressure zones in remaining unblocked areas. These pressure zones may ultimately rupture the filter media.

Efforts have been made to increase the effective filtration surface area of conventional filter elements by increasing the size and/or number of holes in the perforated media-supporting plate surface. However, this tends to weaken the overall filter element structure and predisposes the perforated plate to stress cracking. Too few perforations restricts filtrate flow and creates a larger surface area for the build-up of fibre between the filter media and the perforated plate.

Thus, a lightweight filter element that maximizes filter area, minimizes the tendency for fibre build-up, and that may be retrofit to existing vacuum filter equipment in a cost effective manner would be desirable.

SUMMARY OF THE INVENTION

An object of the present invention is to provide an improved filter element for use in vacuum disk filter assemblies.

In accordance with one aspect of the present invention there is provided a filter element for use in a rotating vacuum filter assembly for removing suspended particles from a liquid carrier, comprising a frame having an inner end, an outer end and intermediate sides which define the perimeter of opposed substantially parallel filter regions and a central filter chamber, wherein the inner end is adapted for mounting the frame to a hollow central hub and wherein the inner end defines a central passage which cooperates with a corresponding passage in the hub for communication between the filter chamber and the interior of the hub. A pleated insert is mounted within the frame substantially parallel to the filter regions so as to bisect the filter chamber and define a series of alternating opposed V-shaped channels extending from the inner end to the outer end, each of which communicate with the central passage, wherein both sets of ridges of the pleated insert lie substantially coplanar with the corresponding filter regions so that when a filter media is stretched across the filter regions the media will rest upon the ridges and thereby define with the pleated insert a series of V-shaped flow chambers. When a vacuum source is applied at the interior of the hub, liquid is urged to pass through the filter media into the flow chambers and to the hub without the filter media collapsing against the V channel surfaces of the pleated insert.

BRIEF DESCRIPTION OF THE DRAWINGS

The present invention will be further understood from the following description with reference to the drawings in which:

FIGS. 2b. illustrate a section of the line A—A of FIG. 2a.

Similar references are used in different figures to denote similar components.

DETAILED DESCRIPTION OF THE DRAWINGS

Figure 1:
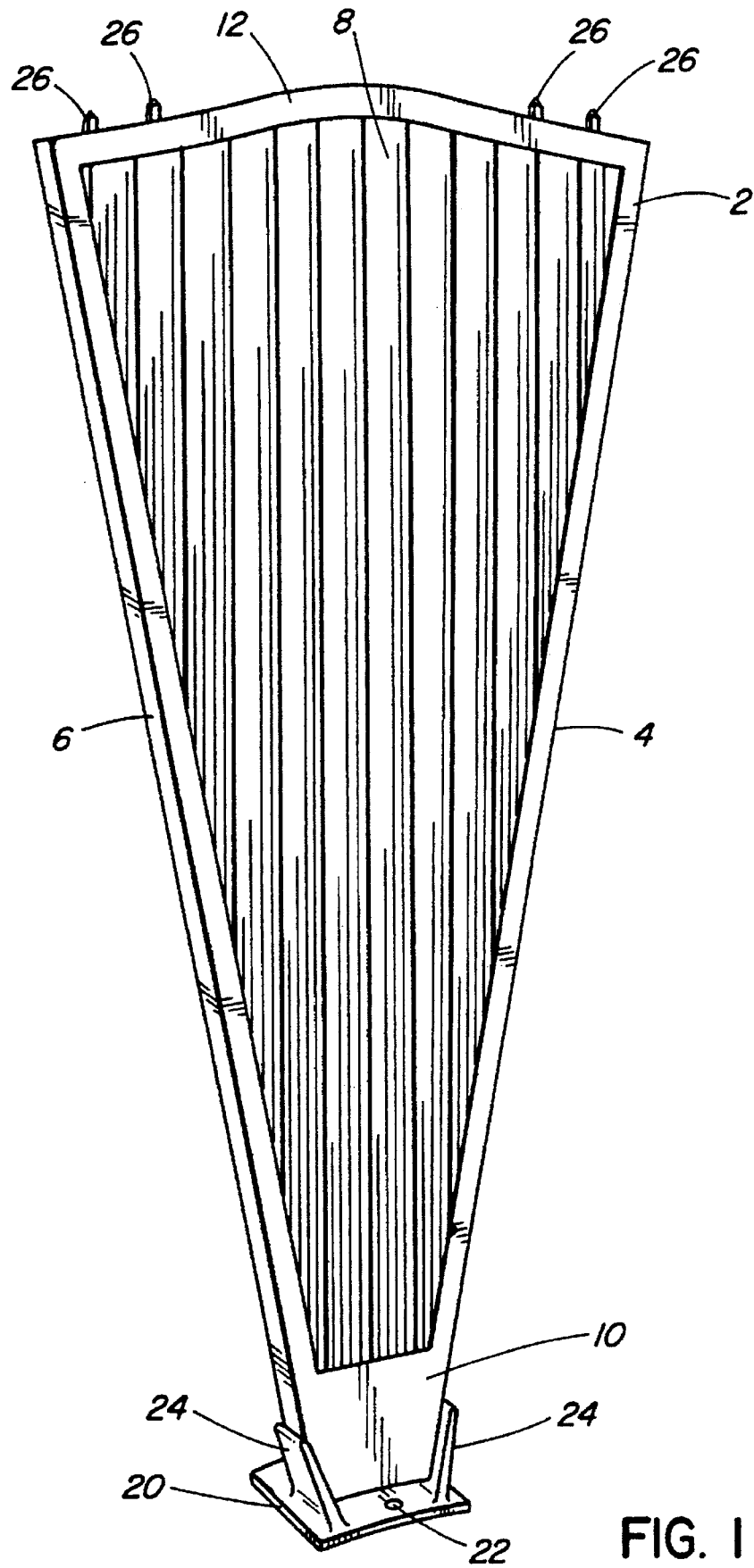
FIG. 1, in a perspective view, illustrates the a filter element in accordance with an embodiment of the present invention.

Referring to FIG. 1, there is illustrated in a perspective view, a filter element in accordance with an embodiment of the present invention. A frame 2 defines the perimeter of the filter element which is formed using welded sections of inward facing C-channel stainless steel. Stainless steel is preferred to avoid corrosion damage, for ease of fabrication and to provide sufficient structural rigidity. The dimensions of the frame, and the included angle of sides 4 and 6 may be easily altered to suit different original equipment filter element dimensions, including the number of filter elements which form each circular filter assembly. The simplicity of the design of the current invention facilitates the custom fabrication required for retrofitting a diverse range of original equipment manufacturer's filter elements.

A pleated insert 8, having a cross-section comprising a series of connected V-shaped channels, may be formed from a continuous sheet of stainless steel using conventional sheet metal equipment and forming methods. The pleated insert 8 may be formed so that when installed the resulting V-channels converge toward the necked or inner end 10 of the filter element, in the manner of a pleated hand-fan, but this introduces unnecessary manufacturing complexity. To maintain manufacturing simplicity, a pleated insert having substantially parallel V-channels generally extending in a radial direction from the inner end 10, as illustrated in FIGS. 1 and 2, is preferred. Use of such a configuration is facilitated by the use of C-channel frame members as further discussed below.

The pleated insert 8 is cut to match the interior dimensions of the perimeter frame 2 and is inserted within the inward facing C-channels of the frame's side members 4 and 6. This step occurs prior to welding the outer end 12 of the perimeter frame in place.

Use of the pleated insert divides the filter chamber, which is defined by the opposing filter regions 14 and 16 (as shown in FIG. 3) and the perimeter frame 2, into opposed filter chambers each comprising a series of radially extending V-channels.

The pleated insert 8 is then welded to the perimeter frame 2 to create a unitary structure. The V-channel cross-section of the pleated insert also serves to increase the rigidity of the overall filter element structure, thereby permitting a significant reduction in the overall weight of the filter element.

Figure 2A:
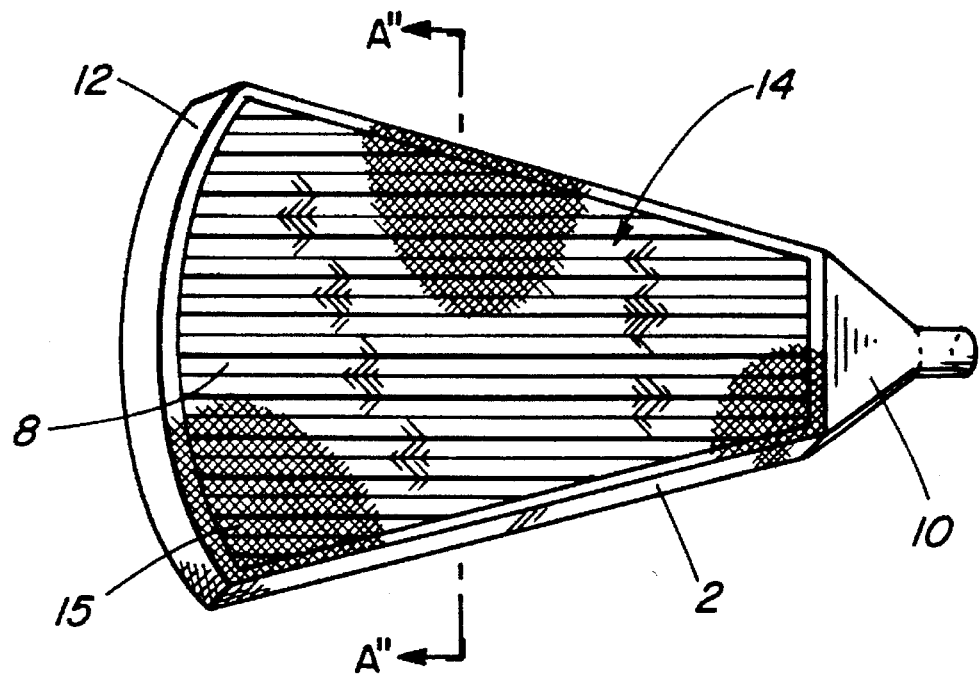
FIG. 2a., in another perspective view, illustrates a filter element in accordance with an embodiment of the present invention.

As shown in FIG. 1, the inner end of the filter element 10 comprises a hollow neck which defines a passage which cooperates with a corresponding passage present in the central hub to permit communication between the interior of the central hub and the filter chamber. Vacuum pressure applied to the inside of the central hub is thereby directed to the individual V-channels. As shown in FIG. 1 the hollow neck terminates in an end plate 20 which is drilled to accept mounting bolts 22 to facilitate mounting of the filter element to the central hub. Gussets 24 may be used to strengthen the base of necked inner end so as to resist flexing and the onset of stress cracking. As indicated in FIG. 2a., the design of the necked end of the filter element may be modified as required to match the mounting requirements, and the corresponding communication passageway of the central hub.

The outer ends 12 of the filter elements are typically locked to adjacent filter elements to minimize relative movement of adjacent filter elements. This tends to minimize fatigue stress and cracking in the structure of the filter element. Fasteners 26 may be used in association with a metal strap to lock adjacent filter elements. Structural support for other styles of retrofitted filter elements may require use of alternative fastening methods. Radial rods located between filter elements, and which extend from an outer circumferential cap member to the central hub, are commonly used. These radially extending rods, and their associated cap member, retain the filter elements in place and provide structural support.

Filter media 15 is used to trap and retain fibres from the slurry bath. A filter media commonly used for vacuum filter elements in the pulp and paper industry is a high-shrink polyester mesh.

The polyester media is cut to size and shape and may be either wrapped around the filter element and heat welded to itself, or may be fabricated into fitted bag having a zipper running up one side (eg. 4 or 6) of the filter element. Once installed, the filter media is subjected to a heat source (eg. hot air, a hot water bath or steam) causing the filter media to shrink. As illustrated in FIGS. 2a. and 2b., the filter media 15 thereby forms a taunt filter membrane spanning both of the opposed filter regions 14 and 16 of the filter element. Prior to heat shrinking, the perimeter of the filter media 15, particularly at the necked end, should be securely anchored to prevent creep of the media from exposing direct passageways to the filter chambers of the filter element. The anchoring required will depend upon the manner in which the filter media 15 is installed on the filter element.

the upper edges of the V-channels of the pleated insert 18 provide a series of generally radially extending support ribs for the filter media to rest upon. This prevents the filter media from collapsing against the surfaces of the pleated insert when vacuum pressure is applied to the filter chambers. The V-channels of the pleated insert and the filter media thereby define a series of independent flow channels having a triangular cross-sections, as illustrated at 28 in FIG. 2db. Each flow channel communicates with the inside of the central hub. As shown in FIG. 1, care should be taken when firing and welding insert 8 to frame 2 that all V-channels that intersect side frame members 4 and 6 are cut back to avoid blocking the area within the C-channel. This area defines a common communication path for vacuum pressure and recovered filtrate which services all V-channels that terminate at by intersecting sides frame members 4 or 6.

Figure 2B:
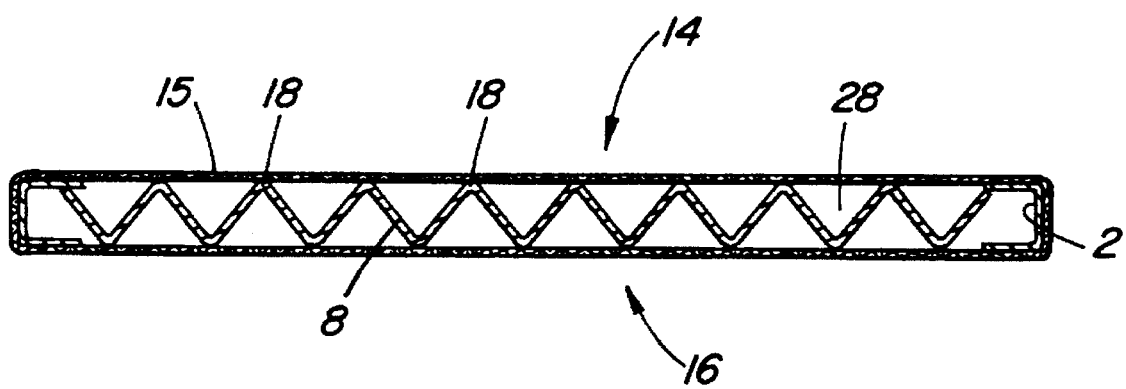

As illustrated in FIG. 2b., the use of a pleated insert 8 minimizes the area of intersection 18 between the filter media and the corresponding filter element supporting member. As a result the effective filter surface area is maximized while minimizing the tendency experienced in other filter element designs for fibres to become trapped between the filter media and its supporting member causing a reduction in the effective filter surface area and localized high vacuum zones. In the present invention, any fibres that pass through the filter media are washed down the smooth walls of the pleated insert by other filtrate.

Although the pleated insert illustrated shows a V-channel cross-section, a corrugated or fluted insert having an S-shaped cross-section may also be used. This however will reduce the efficiency of the filter element as the increased area of intersection between the filter media and the insert 18 will reduce the effective filter area and will increase the filter element's tendency to collect fibres between the media and the ribs of the insert.

Therefore, as installed filter elements rotate with their central hub, throughout the lower portion of their circular path they becomes emersed into a slurry of pulp fibres suspended in liquid. Throughout the period of each filter element's emersion, a vacuum source connected to the hollow central hub, applies suction, or vacuum pressure, which travels up the V-channel chambers 28 in the corresponding filter regions 14 and 16. This vacuum pressure urges liquid to pass through the filter media 15, into the V-channel chambers and then through the necked end 10 into the central hub. The outer surface of the filter media retains pulp fibres resulting in the formation of a fibre mat on each of the opposed filter surfaces. The upper edge of the V-channels 18 prevent the filter media 15 From collapsing upon the V-channel walls thereby maintaining the plurality of central chambers extending generally radially from the inner necked end 10 of the filter element to its outer end 12.

Upon emergence of each filter element from the slurry bath the corresponding vacuum source is interrupted. The fibre mat is dewatered further by residual vacuum until the filter element reaches a point in its circular path where a knock-off liquid shower or where scrapers are used to detach the fibre mat from the filter media.

The mat peels off and falls under its own weight into chutes placed adjacent to the surface of the filter assembly. Fixed or oscillating showers are then used to clean any remaining fibre off the filter element prior to its re-submersion in the liquid-fibre bath, to start the cycle over again.

Tests were conducted in a recycling/de-inking mill to determine the relative effectiveness of filter elements made in accordance with the present invention. Two 12 foot diameter filter assemblies manufactured by Ingersol Rand, each comprising 16 axially spaced disks made up of 18 filter elements segments formed the basis for the test. The Ingersol Rand filter elements utilize a punched plate support for the filter media. In one filter assembly (the Modified Assembly), 126 of the original 288 (or about 44%) of the filter elements were replaced with filter units in accordance with the present invention. The second array of 288 original equipment filter elements were left unmodified and served as a control (the Unmodified Assembly). The Modified Assembly demonstrated an increased in feed capacity (ie. slurry introduced to the slurry vat) to 850 cubic meters per hour from the Unmodified Assembly's 650 cubic meters per hour, a 30 percent increase. Overall production from both assemblies (ie. where the replacement filter elements only represent about 22% of the total number of filter elements) went from 165 tons per day to 295 tons per day, an increase of about 79 percent.

Numerous modifications, variations and adaptations may be made to the particular embodiments of the invention described above without departing from the scope of the invention, which is defined in the claims.

The embodiments of the invention in which an exclusive property or privilege is claimed are defined as followes:

1. In a filter element for use in a rotating vacuum filter assembly for removing suspended particles from a liquid carrier, the filter element including a frame and a pleated insert for supporting a filter medium, the frame having an inner end, an outer end and intermediate sides defining the perimeter of the filter element and where the inner end is adapted for mounting the frame to a hollow central hub and defines a central passage communicating with a corresponding passage in the hub, the improvement comprising;

an inwardly facing c-shaped channel on the frame for permitting movement of a fluid around the perimeter of the frame and wherein the pleated insert includes a plurality of opposed and parallel v-shaped channels each having an apex, the pleated insert mounted within the channel of the frame wherein the apex of each channel is attached within the c-shaped channel at each point of overlap between each apex and the c-shaped channel.

* * * * *